United States Patent [19]

Simmons

[11] Patent Number: 4,578,535
[45] Date of Patent: Mar. 25, 1986

[54] VIDEOTEX SYSTEM

[75] Inventor: Richard M. Simmons, Cambridge, Mass.

[73] Assignee: Telelogic, Inc., Cambridge, Mass.

[21] Appl. No.: 608,115

[22] Filed: May 8, 1984

[51] Int. Cl.[4] .......................................... H04M 11/00
[52] U.S. Cl. .................................... 179/2 DP; 371/69
[58] Field of Search ........... 179/2 DP, 2 TV; 358/85, 358/903, 134, 136; 364/200 MS File, 900 MS File; 371/35, 69

[56] References Cited

U.S. PATENT DOCUMENTS 3,535,456 10/1970 Wilson .
3,889,054 6/1975 Nagel et al. ..................... 358/903 X
3,984,638 10/1976 Carrouge ......................... 179/2 DP
4,093,825 6/1978 Gladstone et al. ............... 371/69 X
4,500,751 2/1985 Darland et al. ................... 179/2 DP

FOREIGN PATENT DOCUMENTS 2734714 1/1979 Fed. Rep. of Germany ... 179/2 TV

OTHER PUBLICATIONS

F. Coakley et al., "A Design for a Small View Data Centre Based on Distributed Control", International Conference on Private Electronic Switching Systems, London, England, 10-12, Apr. 1978, pp. 85-89.
J. Gecsei, "The Architecture of Videotex Systems", 1983, Prentice-Hall, Inc., Englewood Cliffs, N.J., pp. 149-159.

Primary Examiner—Keith E. George
Attorney, Agent, or Firm—Cesari and McKenna

[57] ABSTRACT

A videotex system employs a subscriber unit (22) at a remote location such as a user's home. The subscriber unit (22) employs the user's telephone tone dial (26) for transmission to a communications module at a central location and uses the user's television set (24) for display of information received as frequency-shift-keying signals by the user's telephone (20). At the central location, the system employs a transmission memory (16) containing the currently desired display, and a microprocessor circuit (28) reads the contents of the transmission memory (16) to send it by FSK signals to the remote location. The information contained in the transmission memory (16) comes from a host computer, and an antiquity memory (50) having locations corresponding to those of the transmission memory (16) has its associated location reset whenever a transmission-memory location is written. That antiquity-memory location is then incremented whenever the information is sent, and the microprocessor (28) at the central location repeatedly sends the contents of the transmission-memory location that has been sent least frequency as indicated by the contents in the antiquity memory (50).

7 Claims, 3 Drawing Figures

VIDEOTEX SYSTEM

BACKGROUND OF THE INVENTION

This invention relates to a combined data base and transaction system comprising a communications module at a central location and a plurality of remote subscriber units that communicate with the communications module over a common-carrier transmission medium such as a telephone system. More particularly, it relates to a system employing conventional tone-dialing pads to generate the signals transmitted from the subscriber units to the communications module and employing novel techniques in the transmission of data from the communications module to provide high-quality displays at the subscriber units.

The invention has particular utility in so-called "videotex" systems, in which subscribers can gain access to large central data bases from subscriber units located, for example, in the subscribers' homes and also enter into various business transactions generally related to the contents of the data bases. Typically a transcriber dials up a communications module over a telephone line and receives a response in the form of a display on a video screen. The response typically lists a "menu" of functional options open to the subscriber, and the subscriber in turn responds with a designation of his selection. The communications module then transmits a new display containing information and/or additional selections within the selected category. This interchange continues until the subscriber's video display has narrowed down to a particular item of information he wishes to obtain or a transaction in which he wishes to engage. The present invention is directed to a reduction in the cost of the subscriber units so as to make this type of service more widely acceptable.

In accordance with the invention, transmissions from the communications module to the subscriber units are preferred by means of conventional digital modulation techniques. For example, frequency-shift keying may be employed, with the data transmitted in blocks, each of which also contains error-detection coding. Transmissions from the subscribers to the communications module, on the other hand, are in the form of DTMF signals such as those generated by a conventional tone-dialing key pad. Thus, the subscriber can use a tone-dialing pad instead of a more expensive keyboard and can, in fact, use the keys that are incorporated in his telephone set.

This does not, of course, permit the transmission of a full set of alphanumeric characters to the communications module. However, the ten decimal digits are fully sufficient, since they can be used to designate selections of various options displayed on a screen in response to transmissions from the communications module to the subscriber unit. The two additional keys on the tone-dialing pad (* and #) can serve as function keys, one of them, for example, providing an "enter" function, signaling the communications module to act in response to the key or keys actuated before the function key. The invention can be employed, however, with a full alphanumeric keyboard. The extra frequency combinations employed in the extra keys of a conventional sixteen-key pad can be used to indicate that the combination is part of a sequence of two-frequency combinations that together encode for characters from the larger set of alphanumeric characters.

The subscriber unit also includes a display unit, such as a cathode-ray tube (CRT), which can be the subscriber's own television receiver. Finally, as the only device that must be supplied to the subscriber to enable him to use the service, the subscriber unit includes a small housing containing (1) a sensor that picks up incoming signals from the communications module as received in the telephone handset, (2) a receiver that receives and decodes the signals from the communications module and (3) display circuitry for displaying received data on the CRT screen. The display circuitry includes a random-access refresh memory having a set of storage locations corresponding to locations on the CRT screen and a character generator that responds to the contents of successive storage locations by providing display signals that generate corresponding characters in the associated screen locations.

The refresh memory, character generator, and associated control circuitry are conventional and of relatively low cost. In this connection, I note that in the preferred embodiment of the invention the characters that can be displayed include not only the usual alphanumeric and punctuation characters but also a set of graphic characters that, when displayed in sets of adjacent screen locations, can provide graphic displays. Again, this is a conventional technique for generating graphic displays.

The communications module transmits both character-identifying codes and control codes to the subscriber unit. The control codes include, for example, codes representing the addresses in the refresh memory in which succeeding character-identifying codes are to be stored or the location on the display screen in which a cursor is to be displayed. The subscriber unit includes circuitry for decoding and responding to these and other control codes so as to store incoming character-identifying codes in the appropriate storage locations and to perform various control functions such as blinking the cursor at the appropriate screen location.

In accordance with conventional data-transmission techniques, the communications module transmits data to each subscriber unit in blocks, each block including an error-detection code for the data in the block. According to the present invention, each data block is self-contained in that it contains all of the control codes required for storage of the character-identifying codes in the block and for display of the characters corresponding with those character-identifying codes. Thus, a subscriber unit's use or display of data contained in a data block does not depend on the reception of any other data block.

The communications module continuously transmits display information to each subscriber unit except when it detects a DTMF signal from a subscriber unit. When such a signal is detected, the communications module interrupts its transmission to that subscriber unit until the DTMF signal terminates.

In the usual course of events the communications module transmits an entire display at least several times before the display must be changed in response to a signal received from the subscriber. At the subscriber's end of the system, whenever the subscriber unit detects an error in a data block received from the communications module, it ignores the entire block. The contents of the corresponding locations in the refresh memory are thus unchanged, and the corresponding screen locations therefore display data previously transmitted by the communications module. For several reasons, this data-transmission arrangement minimizes the visual effect of the resulting gaps in the received data.

In the first place, these transmission errors are generally due to noise, which is largely random in nature and therefore is unlikely to affect the same portion of the screen on the next transmission of the data. Therefore, the gaps are generally filled in on the next pass. Moreover, since errors in transmission result in no change in the display in the corresponding screen locations, they do not degrade those portions of the display already containing the correct display characters. Thus, successive passes through the display correct the incorrect portions of the display and, after a few such passes, the entire display faithfully reproduces the depiction sent by the communications module.

Generally, the communications module does not transmit all parts of the display with the same frequency. For example, if only a part of the display is changed, the communications module will for a time transmit that part more often than it transmits unchanged portions of the display. This increases the speed with which new portions of the display attain an error-free condition. Furthermore, as described below, there are various other conditions under which the communications module will refresh different portions of a subscriber's display at different rates.

BRIEF DESCRIPTION OF THE DRAWINGS

These and further features and advantages of the present invention are described in connection with the accompanying drawings, in which.

DESCRIPTION OF THE PREFERRED EMBODIMENT

Figures 1, 3:
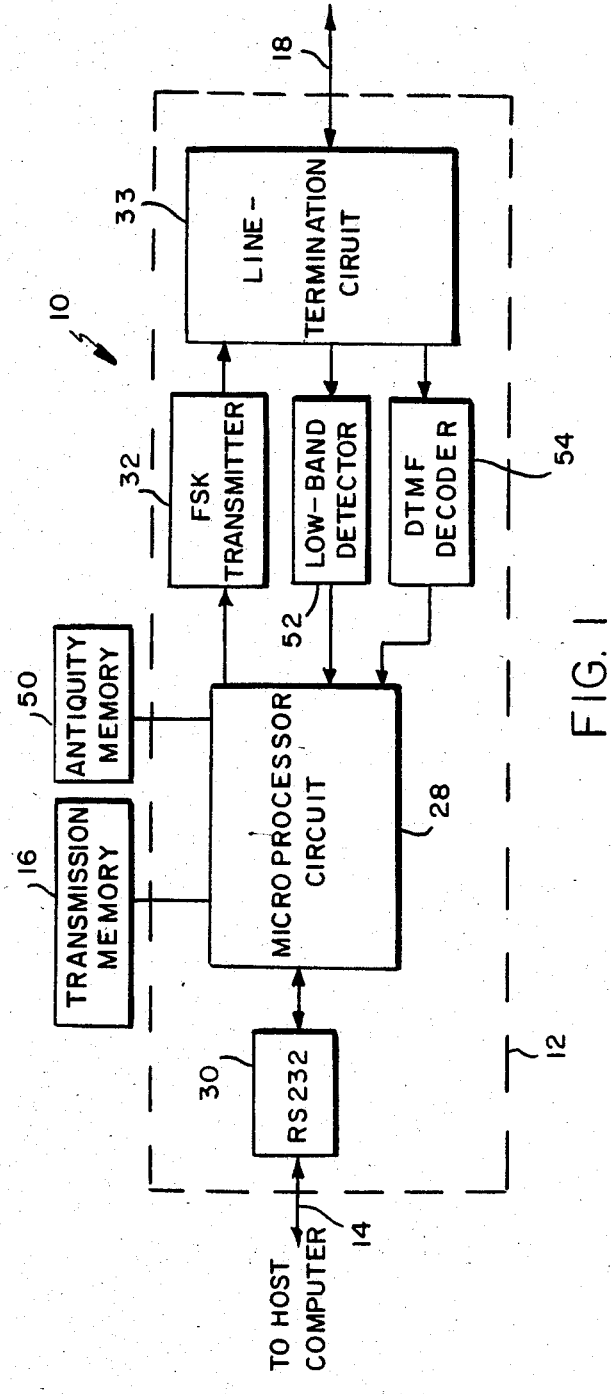
FIG. 1 is a block diagram of a communications module at a central location for transmitting information by frequency-shift keying to a subscriber unit at a remote location and for receiving DTMF signals from the subscriber unit.
FIG. 3 is a diagram illustrating the format of the data blocks in which data are transmitted from the communications module to the subscriber unit.

FIG. 1 depicts in block-diagram form a communications module 10 that includes a control circuit 12. The control circuit receives display information over lines 14 from a host computer and stores the information in a transmission memory 16. It repeatedly generates serial data signals representing the transmission-memory contents and transmits these signals over lines 18 of the telephone network to a telephone set 20 disposed at a remote location depicted in FIG. 2. The data signals are frequency-shift-keying (FSK) signals in the illustrated embodiment, but other types of signals, such as phase-shift-keying signals, can be used instead.

Figure 2:
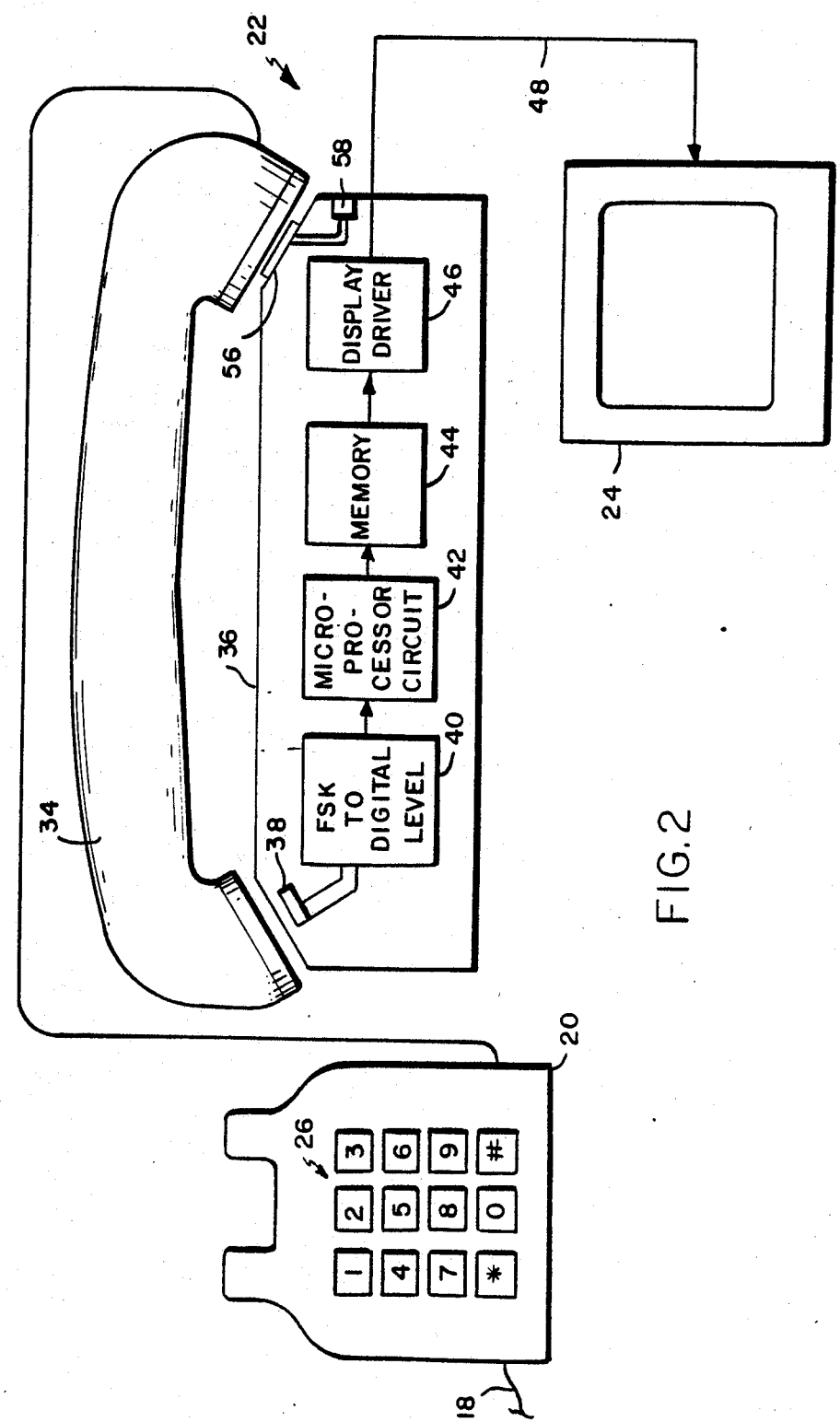
FIG. 2 is a block diagram of the subscriber unit with which the device of FIG. 1 communicates.

A subscriber unit 22 of FIG. 2 stores the information contained in the FSK signals and displays that information on a television set 24. A user at the remote location communicates in the reverse direction by operating the tone dialer 26 of the telephone set 20 to send DTMF signals over the telephone lines 18 back to the central-location equipment depicted in FIG. 1.

The control circuit 12 of FIG. 1 has a microprocessor circuit 28, which includes a microprocessor and certain conventional ancillary devices, such as input/output circuits. The microprocessor circuit 28 operates an RS232 interface 30 to communicate over lines 14 with the host computer.

The microprocessor circuit 28 transmits the contents of the transmission memory to the subscriber unit by operating an FSK transmitter 32, which receives parallel data from the microprocessor circuit 28, translates them to FSK signals, and sends the FSK signals through a line-termination circuit 33 to the telephone lines 18. The line-termination circuit 33 connects and disconnects the remainder of the control circuit 12 to and from the telephone lines 18 and provides the required electrical isolation.

At the subscriber unit of FIG. 2, the handset 34 of the telephone set 20 receives the FSK signals. The handset 34 sits on a housing 36, which contains reception-and-display circuitry for providing signals to the display device 24, in this case a television set, that provides the user with a visual display of the information sent by the equipment of FIG. 1.

Inside the housing 36 is a pick-up coil 38, which detects the FSK signals by sensing the accompanying magnetic fields in the handset 34. Other types of sensors, such as microphones, could be used instead. The pick-up coil 38 applies the sensed signals to a circuit 40 for translating the incoming FSK signals to digital level signals that are applied to microprocessor circuitry 42, which includes a microprocessor and various necessary ancillary circuitry. The microprocessor inspects the received information, in a manner that will be explained shortly, to determine if it has received the information correctly. If so, it writes the information into a refresh memory 44.

The refresh memory 44 contains display codes in memory locations associated with positions on the display, and a display driver 46 reads these codes and generates video signals from them. The display driver 46 typically includes timing circuitry to set timing and keep track of position on the television screen, synchronization circuitry for generating sync signals, a character generator for generating signals in accordance with the shapes of the characters represented by the various display codes, circuitry for generating composite video from the output of the character generator and the sync signals, and means for generating a carrier frequency and modulating it with the composite video. It sends the resultant signals over output line 48 to the television set 24.

It should be noted at this point that the characters represented by the various display codes need not be limited to alphanumeric characters. In order to provide a capability for display of pictorial information, display characters such as those employed in the British Prestel terminal can be included in the character memory. Furthermore, some codes may indicate that succeeding characters in the block will be of a particular indicated color. Such a code would be contained in a location corresponding to a display position. The corresponding display position would then contain a space or, if so indicated by a previously received control character, a "held graphics character"—i.e., a duplicate of the previous character but displayed in the new color.

Thus, the user needs only the apparatus contained in housing 36 in addition to his own tone-dial telephone and a conventional television set. However, it will be apparent that the teachings of the present invention can be practiced with different types of display equipment. A television monitor—i.e., a video display device that generates its display from a baseband composite-video signal—could be used instead. In fact, liquid-crystal displays, printers, or other types of devices for presenting a visual display of characters can be used in the present invention, too. In such cases, the display driver 46 would consist of circuitry appropriate for the type of display device being driven.

The functions performed by the microprocessor circuit 42 can best be understood after the format of the information sent over telephone lines 18 has been described. The format is illustrated in FIG. 3. The information is sent in a conventional asynchronous FSK manner, in which eight-bit bytes are sent in ten-bit frames, each of which includes one start bit and one stop bit. In the illustrated system, the bit position in the byte that commonly contains a parity bit is not used for that purpose. Instead, an error-detection code calculated on a block of a plurality of ten-bit frames is used for error detection.

Information is received in multi-frame blocks that begin with a header frame identified by the legend "header" in FIG. 3. The microprocessor circuit recognizes a frame as a header frame if its first bit is a one, the next three bits are zeros, and all but one of the next four are zeros.

Upon recognizing a header frame, microprocessor circuit 42 interprets the next frame as indicating the number of non-cursor character bytes in the block. Each character byte contains a code for one character. The third through eighth bits of byte 2 indicate the number of non-cursor character frames in the block. In the specific embodiment, the size of the display is twenty-four rows by forty characters per row. No block contains characters for more than one row, so the maximum number of characters contained in a block is forty, a number that can be represented by the six bits, bits three through eight.

The second, or overwrite, bit of byte 2 indicates whether a line is to be erased. If a whole line of characters is being replaced by just a couple of characters and the remainder of the line is to contain spaces, it is efficient to send just the characters to be displayed and an indication that the entire row is to be erased before the characters are added. If the overwrite bit is a zero, the line is erased before the characters in the block are added. If the overwrite bit is a one, the microprocessor 42 rewrites only those refresh-memory locations whose contents are to be replaced by the transmitted characters.

Bytes 3 and 4 of the block contain the address of the first refresh-memory location into which the characters are to be written. In order to avoid confusion between address bytes and header bytes, bytes 3 and 4 both begin with zeros. The remaining bits of both bytes together contain the address of the first character, the address of any refresh-memory location being equal to the column number of its associated display position (0-39) plus forty times the row number (0-23) of that position. Remaining characters in the block are placed in successive refresh-memory locations.

The maximum value of the address for a character is 959, but the apparatus at the central location might also send "addresses" in the range 960 to 980. These numbers are not an indication of a position on the screen in which characters are to be displayed, nor are they an indication of a location in the refresh memory 44 in which data are to be stored. Instead, they are commands to the microprocessor 42 to perform various specific functions, such as clearing the screen.

The next bytes depicted in FIG. 3 are the character-containing bytes, byte 5 through byte N+4, where N is the number of characters in the block, including the cursor if the block contains the cursor. The first bit of a character-containing byte can be either a one or a zero. Confusion with header bytes is avoided because no character byte whose first bit is a one has zeroes as the second through fourth bits. The second through seventh bits of a character byte contain the usual seven-bit ASCII codes, but the first bit, as was mentioned above, does not contain parity information. Instead, it is used to extend the range of possible codes to contain control characters. In the past, transmission of an extra character was needed to achieve this result.

For instance, a particular seven-bit code might represent either a capital Q or a control character indicating that the following characters will be interpreted as graphics and colored red. In previous systems, that code would ordinarily be interpreted as a capital Q, and it would be necessary to send a special mode-change ("escape") code beforehand to indicate that the code should be interpreted as graphics red rather than a capital Q. In this illustrated arrangement, the presence of a one in the first bit position indicates that the code represents the color rather than the letter, so the need for transmission of the mode-change character is eliminated.

The character bytes are followed by two bytes of error-detection code, bytes N+5 and N+6, which complete the block. The error-detection code in bytes N+5 and N+6 differs from a standard sixteen-bit CRC code only in that the first bit of each byte has been set to zero so as to avoid confusion of these bytes with a header byte. In order to retain the information that would have been in the first bits of these two bytes if they had not been set to zero, the communications module sets one of the fifth through eighth bits of the header byte to a one to indicate what the values of the first bits of the error-detection-code bytes would have been if they had not been set to zero. Specifically, the fifth bit of the header byte is a one and the sixth through eighth bits are zeros if the first bit of each error-detection byte would have been a one. The sixth header bit is the bit set to a one if the first bits of the first and second error-detection bytes could have been zero and one, respectively. If they would have been one and zero, respectively, it is the seventh header bit that is set to one. If the first bit of each error-detection byte would have been a zero, the eighth header bit is the bit set to a one. The communications module must therefore assemble the rest of the entire block before it can compute and transmit the header.

With this block format in mind, the operation of the microprocessor circuit 42 can readily be understood. The microprocessor 42 monitors the output of the FSK translation circuit 40 until it detects a frame that begins with a one followed by three zeros. This sequence indicates that the frame is a header, and the microprocessor notes the position of the one in the last four bits of the header for use when the error-detection frames are received. When it receives the next frame, it notes whether a line is to be replaced or merely overwritten, and it records the number of non-cursor characters that are contained in the block. It then interprets the contents of the third and fourth received bytes as the address into which the first character is to be stored. If the "address" is not within the range of the display, the microprocessor interprets it as a command.

Microprocessor 42 next interprets as characters the contents of as many frames as are indicated by the length portion of byte 2, not counting any frame whose contents represent a cursor. If the contents of a frame represent a cursor, microprocessor 42 does not store the cursor code in the next refresh-memory location. Instead, that refresh-memory location is used to store the contents of the frame following the one with the cursor, and the address of that location is stored in a cursor register that indicates where the cursor is to be displayed. Microprocessor 42 then periodically swaps the character code in that location with the cursor code to effect a blinking cursor at the corresponding display position.

Accumulation of characters continues until the number of characters indicated by byte 2 have been accumulated. The microprocessor then interprets the next two bytes as error-detection codes, augmenting them in accordance with the final four bits of the header byte, and determines whether the error-detection code is consistent with the remainder of the block. If so, the microprocessor circuit 42 stores the characters in the refresh memory 44, beginning at the address indicated in bytes 3 and 4. This changes the contents of the refresh memory 44 and thus the information on the screen of the television set 24. If the block instead contains an "address" interpreted as a command, the command is executed at this time.

If the microprocessor 42 determines that the error-detection-code is inconsistent with the remainder of the block, it does not write the received characters into the refresh memory 44. Furthermore, it sends no indication of the error to the central location. The apparatus 22 is therefore quite simple because it includes hardware for receiving signals over the telephone lines but not for transmitting them. Transmission from the subscriber unit is performed only by the subscriber, who sends signals by operating the dial 26.

The subscriber unit does not have to give the communications module an indication of the error in transmission, because the communications module repeats the transmission regardless of whether an error previously occurred. Accordingly, the information eventually is displayed correctly on the television set 24, as the following description of the operation of the display-transmission device of FIG. 1 will demonstrate.

As was indicated above, the host computer sends information to the display-transmission device of FIG. 1 concerning the characters to be displayed in the respective display positions, and microprocessor 28 writes the information into the transmission memory 16 in response. It reads the contents of the transmission memory 16 continually and sends them by way of the FSK transmitter 32 to the subscriber unit.

Since the FSK transmitter sends the data over telephone lines, which typically have a narrow bandwidth, the data are transmitted at a relatively low rate, say, 1200 bits/second. Since there are 960 positions in the display, and since the transmission of each character takes at least ten bit times, the time required for a complete rewriting of the display is greater than eight seconds at 1200 baud. If the microprocessor 28 were to send the entire contents of the transmission memory 16 before repeating, it could thus take over eight seconds for even a small change in the display to appear on the user's television set.

In order to avoid such a delay, newly written characters are sent immediately, before the "older" contents are sent again. To operate in this way, the communications module 10 of FIG. 1 includes an antiquity memory 50. The antiquity memory maintains a count of how many times data from each location in the transmission memory 16 have been transmitted since the last time microprocessor 28 wrote new data into that location. That is, there is a separate location in the antiquity memory 50 associated with each location in the transmission memory 16. When microprocessor 28 writes information into a given location in the transmission memory 16, it resets the contents of the corresponding location in the antiquity memory 50, and it increments that corresponding location each time it transmits the contents of the transmission-memory location. This incrementing continues until the contents of the corresponding antiquity-memory location reach a maximum antiquity value, e.g. fifteen. After that, the contents of that antiquity-memory location remain constant at the maximum value until the microprocessor again writes into the given transmission-memory location and thus resets the antiquity-memory location.

In transmitting information, the microprocessor 28 does not just select transmission-memory locations in order. Instead, it examines the contents of the antiquity memory 50 to determine which locations in transmission memory 16 have the lowest antiquity value, and it preferentially transmits information from locations that have the lowest antiquity values—that is, it transmits that information more frequently than the information from locations with higher antiquity values—until the antiquity values of those locations catch up. Clearly, there are many possible ways to perform the preferential transmission of the present invention. For instance, contents with the lowest antiquity values can be sent, say, twice for each time contents having higher antiquity values are sent. In the illustrated embodiment, however, the method of preferential transmission is simply to have each block include information from a location with the lowest antiquity value. If several locations have the lowest antiquity value, the microprocessor 28 chooses for transmission the first one of these that follows the last location from which contents were sent in the last transmission block.

Some of the transmission-memory locations with the lowest antiquity value may represent display positions on the same line as that associated with the contents first chosen for transmission. In some embodiments, it may be desirable to include programming in the communications module for identifying the most efficient of several different ways of transmitting those characters. That is, the "youngest" on that line might be sent in separate transmission blocks, on the one hand, or together in one block, on the other. Also, the programming might determine whether to erase the entire line or merely overwrite some existing locations and whether some of the older information should be sent along with that having the lowest antiquity value.

It will be recognized that, whenever all of the antiquity-memory locations have reached the same, maximum antiquity value, the contents of the entire transmission memory will repeatedly be transmitted line-by-line, a complete line being transmitted in each block.

The result of this arrangement is that the display on the television screen responds quickly to small changes in the contents of the transmission memory 16. At most times, the contents of any location in the transmission memory 16 will have been sent to the subscriber unit several times. When new data are written into one or more locations, those locations are immediately the "youngest," usually by several transmissions. These data are thus sent several times in succession before any of the other contents are sent again if the system is one in which each block must contain information having the lowest antiquity value. Thus, when a single line or less of new data is written into the transmission memory 16, the very next block to be sent contains all these new data, and transmission of the new data is repeated until these data have been transmitted as often as other data in the transmission memory 16. In other embodiments of the present invention, blocks with the newest information might not be transmitted to the exclusion of blocks without it, but the newest information is still transmitted preferentially.

Accordingly, if the first transmission of these data contains an error, there is no need for the subscriber unit to notify the central location that an error has occurred; the subscriber unit simply avoids recording the transmission that was in error and waits for the next transmission of those data, which typically will be the next transmission of a data block.

As was stated above, the microprocessor 28 ordinarily sends contents of the transmission memory 16 continually. However, the control circuit 12 includes a low-band detector 52, which monitors the telephone lines 18 to detect the presence of DTMF signals. A ten- or twelve-button tone dial is capable of transmitting seven different frequencies, three of which are high frequencies and four of which are low frequencies. Each button causes simultaneous transmission of a different combination of two frequencies, each combination including one high fequency and one low frequency.

The high frequencies are within the frequency band of the FSK signals, so the high-frequency component of the DTMF signal is not easy to detect while FSK signals are present. The low-frequency signals are not within the FSK frequency band, however, and they thus are readily detectable by a low-band detector circuit 52. The presence of these low-frequency signals is an indication that DTMF signals are present. On determining that such signals are present, the microprocessor 28 stops the transmission of the current data block.

With the FSK signals interrupted, both the high and low DTMF frequencies can now be detected, and a DTMF decoder 54 decodes the DTMF signals and sends the resulting digit signals to the microprocessor 28 to indicate the contents of the DTMF transmission.

In the illustrated embodiment, the microprocessor 28 simply forwards this information over the RS232 interface 30 and lines 14 to the host computer. It is possible, however, that transmissions from a more elaborate subscriber unit would require more processing by the microprocessor circuit 28. For instance, the subscriber unit could be provided with a keyboard similar to a typewriter keyboard and thus having many more keys than the typical tone dial. Such a subscriber unit would encode each key, not as a single combination of two tones, but as a succession of two or three two-tone combinations. To service such a subscriber unit, the microprocessor 28 would accumulate the groups of decoded signals from decoder 54 and translate them into, say, ASCII codes for transmission over the serial interface 30 to the host computer 14. To allow for expansion of the unit of FIG. 2 to accommodate such a keyboard device, a speaker 56 is included in the housing 36 beneath the transmitter of the handset 34, and a jack 58 is provided so that the keyboard device can be plugged in to drive the speaker 56 with DTMF signals.

It is possible for a user's depression of a tonedial button to be so short in duration that FSK transmission could not be interrupted in time to permit receipt of the DTMF signal. This does not present a serious problem, however, because the system is ordinarily arranged so that the host computer acknowledges the user's entry with a modification of the display. If the user sees no such acknowledgment, he merely repeats the transmission, and the transaction continues.

While transmission of FSK signals interferes with communications-module reception of DTMF signals, transmission of DTMF signals can interfere with subscriber-unit reception of FSK signals. The error-detection and retransmission described above largely eliminate the possibility of an incorrect display resulting from DTMF-signal transmission. If further protection is desired, however, the subscriber unit can be provided with a low-band detector that receives the output of the pick-up coil 38 and supplies a detection signal to microprocessor circuit 42 to prevent it from accepting signals from the FSK translator 40 while DTMF signals are present.

In a typical transaction employing the videotex system described above, the subscriber removes the handset 34, places it on the housing 36 with the receiver on top of the pick-up coil 38, and turns on the television set 24 as well as the reception-and-display circuitry in housing 36. He then dials up the communications module shown in FIG. 1. The host computer responds by transmitting over lines 14 signals representing an initial display to be shown on the subscriber's television set. The microprocessor circuit 28 loads the transmission memory and begins transmission to the telephone set 20 in the manner described above.

After, say, ten seconds of transmission, the refresh memory 44 contains display codes for the complete initial display. This display invites certain responses from the user, the first response typically being entry of some identifying code. The user observes this initial display and uses the dial 26 to send the code. When he does so, the communications module detects the presence of the DTMF signals and accordingly interrupts transmission of FSK signals so that it can decode the DTMF signals effectively.

The results of the decoding are sent to the host computer, which responds by sending signals to modify the contents of the transmission memory 16 so that the display on the television set provides an echo of the signals sent by the user. Since this echo is the "youngest" information in the transmission memory 16, it is sent as soon as FSK transmission resumes, so the echo appears on the user's television screen with little delay.

If the subscriber has made an error, or if an error has occurred in the reception of the DTMF signals, the echo sent by the host computer typically reflects this error, and the user can then repeat the DTMF transmission to send the correct identification code. If the DTMF transmission has occurred correctly but an error has arisen in the FSK transmission, the error is detected by the subscriber unit and is not displayed on the television screen. Because the new information, having the lowest antiquity value, is retransmitted several times before transmission of the pre-existing information, the new information is soon received correctly and displayed on the television screen.

Once the initial colloquy has been completed, the communications module typically sends further requests for responses from the user, and communication continues until the transaction has been completed. At the end of the transaction, the user simply hangs up his telephone and turns off his local circuitry and television set.

It will be apparent as a result of the foregoing description that the present invention provides a videotex system that requires a minimum of user equipment for effective operation and yet can readily be expanded to accommodate more-elaborate subscriber units without changing the communications module at the central location or the medium of communication employed. It employs the ordinary telephone network to send information for a video display and yet responds with display changes that occur very quickly in most situations. Furthermore, in its simpler forms, the present invention can be arranged to use the television and telephone that are already present in the user's home and thus requires a minimum of extra home equipment.

I claim:

1. A communications system for communicating over a telephone network between a central location and a remote location, the communications system comprising:
   A. a transmission memory at the central location including transmission-memory locations, associated with display positions in an intended display in which the display positions are organized in rows and columns of display positions, for containing display codes representing display characters to be displayed in the associated positions, the transmission memory being operable to have display codes written into the transmission-memory locations and to have display codes read therefrom;
   B. a control circuit at the central location, connected to write information into and read information from the transmission memory and adapted to receive information from a data source, for writing information from the data source into the transmission-memory locations, for repeatedly transmitting to the remote location over the telephone network serial data signals representing the contents of the transmission memory in blocks beginning with one of one or more header sequences and including length, address, and overwrite fields and a display-code field, whose length is indicated by the contents of the length field, containing display codes read from the transmission memory, the control circuit being further connected to receive DTMF signals from the remote location over the telephone network and generating an indication of the digital data represented thereby;
   C. a telephone set at the remote location, including a DTMF dial connected to send DTMF signals over the telephone network to the control circuit at the central location, for receiving the serial data signals sent over the telephone network by the control circuit at the central location;
   D. a reception-and-display circuit at the remote location including:
      (1) a refresh memory including refresh-memory locations, associated with display positions, for containing display codes representing display characters to be displayed at the associated display positions, the refresh memory being operable to have display codes written into the refresh memory and to have display codes therein read therefrom;
      (2) monitoring and writing means connected to write display codes into the refresh memory and coupled to the telephone set to monitor the serial data signals received thereby, for writing into the refresh memory transmission-memory contents represented by the serial data signals, the monitoring and writing means monitoring the serial data signals received by the telephone set to identify one or more predetermined header sequences as the beginning of a transmission block that includes length, address, and overwrite fields and a display-code field of a length indicated by the contents of the length field, the monitoring and writing means responding to the contents of the overwrite field by erasing the contents of all of the refreshmemory locations that do not receive display codes from the transmission block but are associated with positions in the same line as the position associated with the address in the address field if the contents of the overwrite field are of one value and by writing into only those transmission-memory locations for which display codes are contained in the transmission block if the contents of the overwrite field are of another value; and
      (3) a display driver connected to read the contents of the refresh memory and generate display signals representing a display in which the characters represented by the display codes in the refresh-memory locations are located at the display positions associated therewith; and
   E. a display device, connected to receive the display signals from the display driver, for producing the visual display represented by the display signals.

2. A communications system for communicating over a telephone network between a central location and a remote location, the communications system comprising:
   A. a transmission memory at the central location including transmission-memory locations, associated with display positions in an intended display in which the display positions are organized in rows and columns of display positions, for containing display codes representing display characters to be displayed in the associated positions, the transmission memory being operable to have display codes written into the transmission-memory locations and to have display codes read therefrom;
   B. an antiquity memory including antiquity-memory locations, each antiquity-memory location being associated with a transmission-memory location;
   C. a control circuit at the central location connected to write information into and read information from the antiquity and transmission memories and adapted to receive information from a data source, for writing information from the data source into transmission-memory locations, for, upon writing information into a transmission-memory location, resetting the contents of the antiquity-memory location associated therewith to indicate that the number of transmissions since the last writing is zero, for repeatedly transmitting to the remote location over the telephone network serial data signals representing the contents of the transmission memory, and for, upon transmission of the contents of a transmission-memory location, modifying the contents of the antiquity-memory location associated therewith to increment the number of transmissions indicated thereby, the control circuit preferentially transmitting the contents of the transmission-memory locations associated with antiquity-memory locations whose contents indicate the lowest number of transmissions since data were last written into those transmission-memory locations, the control circuit being further connected to receive DTMF signals from the remote location over the telephone network and generating an indication of the digital data represented thereby;

D. a telephone set at the remote location, including a DTMF dial connected to send DTMF signals over the telephone networks to the control circuit at the central location, for receiving the serial data signals sent over the telephone network by the control circuit at the central location;

E. a reception-and-display circuit at the remote location including:
  (1) a refresh memory including refresh-memory locations, associated with display positions, for containing display codes representing display characters to be displayed at the associated display positions, the refresh memory being operable to have display codes written into the refresh memory and to have the display codes therein read therefrom;
  (2) monitoring and writing means connected to write display codes into the refresh memory and coupled to the telephone set to monitor the serial data signals received thereby, for writing into the refresh memory transmission-memory contents represented by the serial data signals; and
  (3) a display driver connected to read the contents of the refresh memory and generate signals representing a display in which the display characters represented by display codes in the refresh-memory locations are located at the display positions associated therewith; and F. a display device, connected to receive the display signals from the display driver, for producing the visual display represented by the display signals.

3. A communications system as recited in claim 2 wherein the control circuit increments the contents of an antiquity-memory location upon transmission of the contents of its associated transmission-memory location only if the contents of that antiquity-memory location indicate a number of transmissions less than a predetermined maximum antiquity.

4. A communications module for sending digital signals representing display characters and display-screen positions at which they are to be displayed, the communications module comprising:

A. a transmission memory including transmission-memory locations, associated with display positions in an intended display, for containing display codes representing display characters to be displayed at the display positions, the transmission memory being operable to have display codes written into the transmission-memory locations and to have display codes read therefrom;

B. an antiquity memory including antiquity-memory locations, each antiquity-memory location being associated with a transmission-memory location;

C. a control circuit, connected to write information into and read information from the antiquity and transmission memories and adapted to receive information from a data source, for writing information from the data source into transmission-memory locations, for, upon writing information into a transmission-memory location, resetting the contents of the antiquity-memory location associated therewith to indicate that the number of transmissions since the last writing is zero, for repeatedly transmitting the contents of the transmission memory, and for, upon transmission of the contents of a transmission-memory location, modifying the contents of the antiquity-memory location associated therewith to increment the number of transmissions indicated thereby, the control circuit preferentially transmitting the contents of the transmission-memory locations associated with antiquity-memory locations whose contents indicate the lowest number of transmissions since data were last written into those transmission-memory locations.

5. A communications module as defined in claim 4 wherein the control circuit:
A. is adapted for connection to a telephone network to transmit serial data signals thereover and receive DTMF signals therefrom; and
B. transmits over the telephone network serial data signals representing transmission-memory contents in blocks beginning with one of one or more header sequences and including length, address, and error-detection fields of predetermined lengths and a display-code field of a length indicated by the contents of the length field and containing display codes representing the contents read from the transmission memory, the contents of the error-detection field being a predetermined function of the contents of the rest of the block.

6. A communications module as defined in claim 5 wherein the control circuit interrupts its transmission of serial data signals when it receives DTMF signals over the telephone network, and wherein it subsequently resumes transmission by retransmitting any block that was thereby interrupted.

7. A communications module as defined in claim 4 wherein the control circuit increments the contents of an antiquity-memory location upon transmission of the contents of its associated transmission-memory location only if the contents of that antiquity-memory location indicate a number of transmissions less than a predetermined maximum antiquity.

* * * * *